July 14, 1942.　　A. H. RZEPPA ET AL　　2,289,683
JIG
Filed Sept. 15, 1941　　2 Sheets-Sheet 1
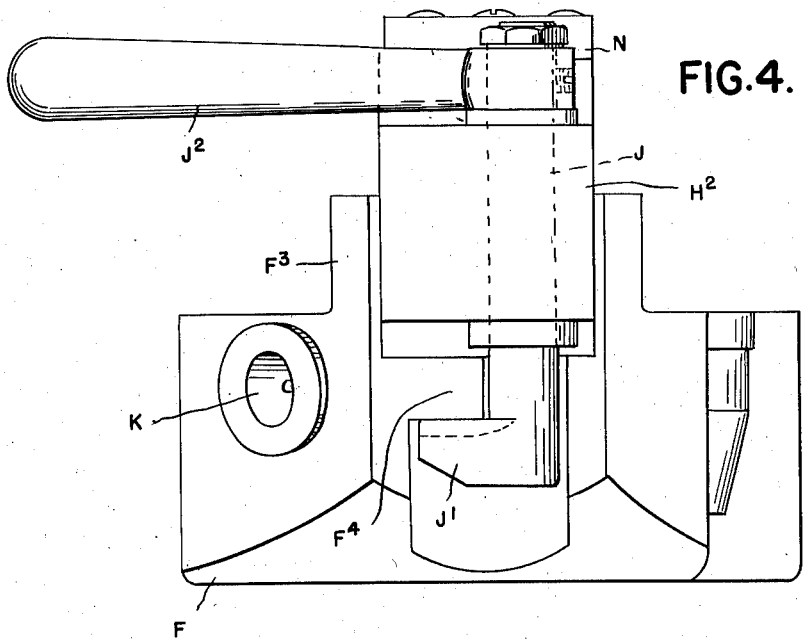
FIG. 4.
FIG. 1.
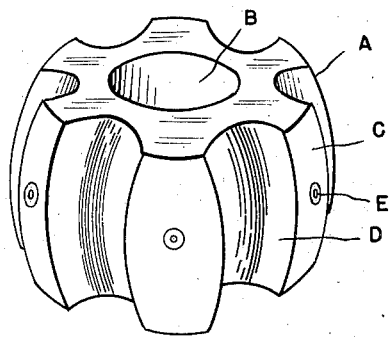
INVENTORS
ALFRED H. RZEPPA
BY　　FRED F. MILLER JR.
ATTORNEYS July 14, 1942.  A. H. RZEPPA ET AL  2,289,683
JIG
Filed Sept. 15, 1941  2 Sheets-Sheet 2

INVENTORS
ALFRED H. RZEPPA
FRED F. MILLER JR.
BY Whittemore Hulbert & Belknap
ATTORNEYS Patented July 14, 1942

2,289,683

UNITED STATES PATENT OFFICE 2,289,683

JIG

Alfred H. Rzeppa, Grosse Pointe, and Fred F. Miller, Jr., Ferndale, Mich., assignors to The Gear Grinding Machine Company, Hamtramck, Mich., a corporation of Michigan Application September 15, 1941, Serial No. 410,956

4 Claims. (Cl. 51—217)

The invention relates to jigs for use in holding work during the performance of grinding operations thereon and has more particular reference to a construction for use in the grinding of ball race ways in one of the elements in a universal joint. This element comprises a spherical member having a series of meridian grooves therein uniformly spaced around the periphery thereof. The element is originally formed by machining, but is subsequently heat treated and hardened so that the final finishing operation must be performed by grinding. It has been found that the unavoidable distortion resulting from heat treatment and hardening renders the centers used during the machining operations inaccurate for performing the grinding operations. Therefore, if such centers are to be used during grinding, they must first be corrected, which is a difficult operation to perform.

It is the object of the invention to avoid the necessity of using such centers during the grinding operation, and it is a further object to obtain a construction of jig which is easily and quickly engaged with the work and by means of which a high degree of accuracy is obtained. To this end the invention consists in the construction as hereinafter set forth.

In the drawings:

Fig. 1 is a perspective view of the element which is to be ground;

Fig. 4 is an end elevation.

As shown in Fig. 1, the element A is an annular member having a central cylindrical aperture B and an external spherical surface C. Spaced around the external surface are meridian grooves D which are of a cross section corresponding to the diameter of the balls to be engaged therewith and which are also longitudinally arcuate to be concentric with the spherical outer surface. In originally machining this element, pairs of centers E are formed therein on diametrically opposite sides, each pair forming an axis for a pair of grooves in a plane at right angles to said axis. However, as above stated, the heat treatment and hardening operations produce sufficient distortion to render such centers inaccurate for use in grinding.

Our improved jig comprises a member F which is centrally recessed to receive the member A and has a pin portion G extending up in the central aperture B. Hinged to the member F is a cooperating member H which is adapted to extend diametrically across the same and to be locked down on the opposite side thereof. The hinge is formed by a pin I engaging the depending lug H' on the member H and the outwardly extending furcations F'' on the member F. On the opposite side, the member H has a depending lug $H^2$ between the upwardly extending furcations $F^3$ on the member F, and a locking means is provided comprising the rotatable shaft J extending through the lug $H^2$ having a hook J' at its lower end for engaging a keeper lug $F^4$. A handle $J^2$, attached to the upper end of the shaft J, forms an operating member for locking and unlocking the member H. On diametrically opposite sides of the member F and in a plane having a predetermined angular relation to the central plane of the member H are centers K, and these are formed in obliquely extending faces of the member F and are so positioned as to be in alignment with the center of the spherical surface of the member A when arranged within a recess in the member F. The member H is provided with cylindrical recesses $H^3$ therein, the axes of which are in the central plane of said member. Within these cylindrical recesses are cylindrical members L which at their lower ends are provided with spherical portions L' of a radius equal to that of the cross sectional contour of the grooves D. M are springs located in central recesses in the members L, and N are cap members forming abutments for the upper ends of said springs. The springs are placed under the required tension by limit pins O, passing centrally therethrough and having heads O' engaging recesses in the cap members N and being threaded at their lower ends for engagement with nuts P. Screws Q serve to secure the cap members N to the member H.

Figure 3:
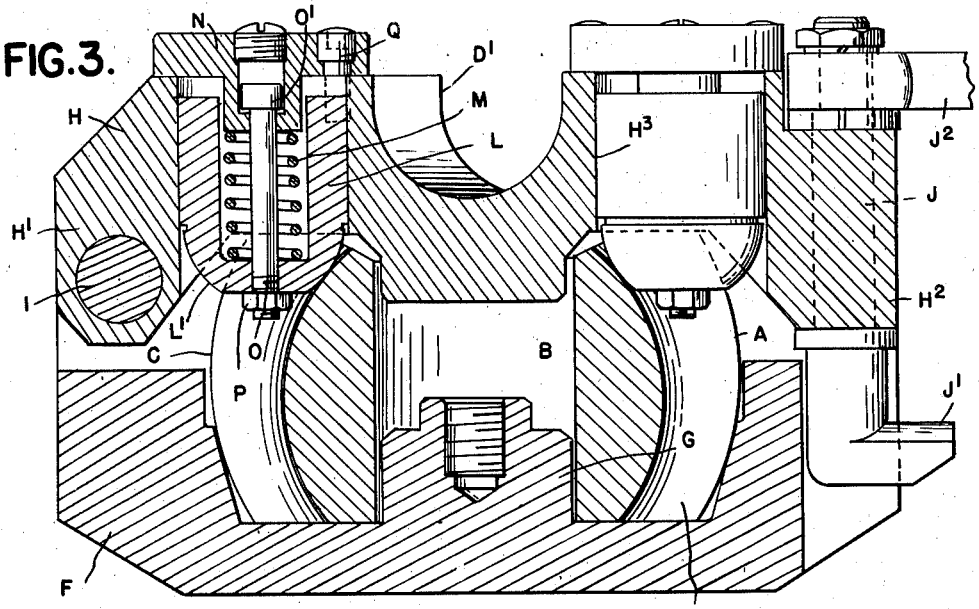
Fig. 3 is a cross section on line 3—3 of Fig. 2.
Figure 2:
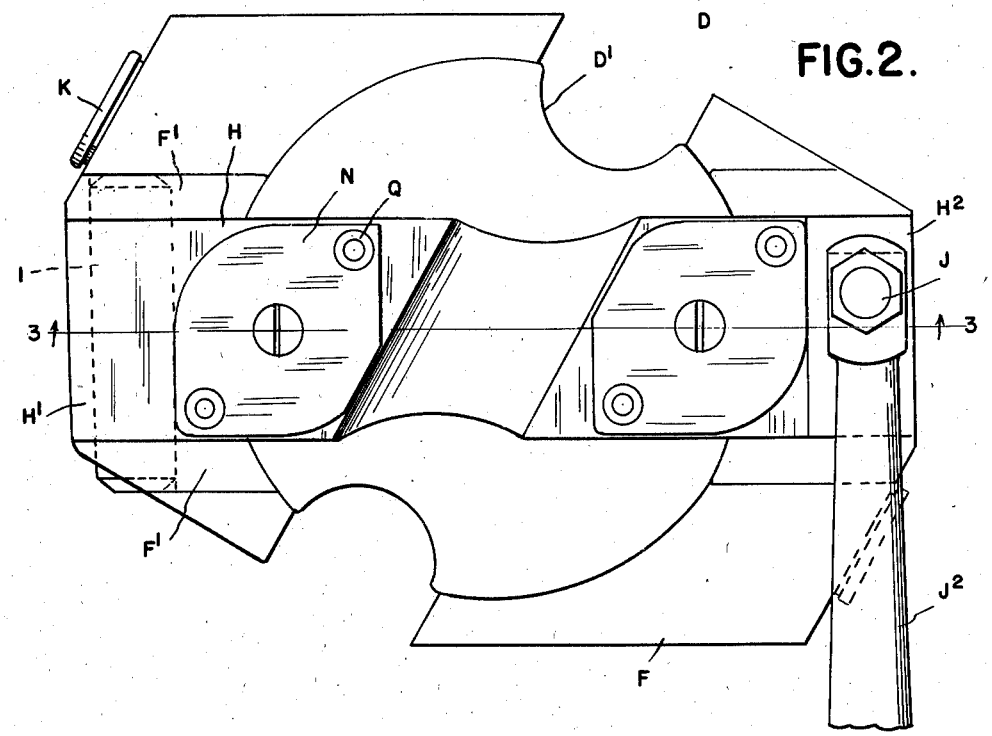
Fig. 2 is a plan view of the jig with the element engaged therein.

With the construction as described, the member A is engaged with the jig by first throwing back the member H on its hinge, placing the member A in the recess in the member F, and then turning down the member H and locking it by the hook J'. In so doing, the spherical ends L' of the members L will engage diametrically opposite grooves D in the member A, and the springs M will resiliently press these members against the bottom surfaces of the grooves. When thus secured, the jig may be mounted in the grinder upon centers engaging the center recesses K. The line connecting these centers is at an angle to the central plane of the members L, such as to exactly bisect the angle between the planes of adjacent grooves D in the member A. As specifically illustrated, the member A has six of these grooves, which are in planes at an angle of 60° to each other and passing through the center of the sphere. Thus, as shown in Fig. 2, the grooves D' are in a plane which is perpendicular to the axes of the centers K, so that these grooves may be ground by the rotation of the jig upon the centers. After grinding the first pair of grooves, the member F is unlocked and turned back to permit rotatably adjusting the member A through an angle of 60°, after which the member F is again turned back and locked. This positions the member A so as to grind the second pair of grooves in a plane exactly 60° from the plane of the first ground grooves, after which another adjustment is made to position the member A for grinding the third pair of grooves. Thus, regardless of any slight distortion that may occur in the member A, due to heat treatment and hardening, all of the grooves will be ground so as to be spaced from each other the desired angle and to be concentric with the center of the member A.

What we claim as our invention is:

1. A jig for holding spherical members while grinding meridian grooves therein, comprising a member recessed for receiving said spherical member and provided with centers which are in alignment with the center of the sphere, a second member for clamping said spherical member within the recess, and means engaging one of the grooves in said spherical member for positioning the same relative to the line of said centers so that another groove lies in a plane perpendicular to said line.

2. A jig for holding spherical members while grinding equi-spaced meridian grooves therein, comprising a member recessed to receive said spherical member and provided with a pair of centers in alignment with the center of the sphere, means for clamping said spherical member in said recess, and means for engaging diametrically opposite grooves in said spherical member for holding the same so that the line connecting said centers is perpendicular to the plane of another pair of centers.

3. A jig for holding spherical members while grinding equi-spaced meridian grooves therein, said grooves being also concentric with the center of the sphere; comprising a member recessed to receive said spherical member and provided with a pair of centers in alignment with the center of the sphere, a clamping member secured to said recessed member, and means carried by said clamping member for engaging a pair of diametrically opposite grooves in said spherical member to hold the same at such an angle to the line of said centers that another pair of diametrically opposite grooves will be in a plane perpendicular to said line.

4. A jig for holding spherical members while grinding equi-spaced meridian grooves therein, said grooves being also concentric with the center of the sphere; comprising a member recessed to receive said spherical member and provided with a pair of centers in alignment with the center of the sphere, a member hinged to said recessed member to swing in a plane at a predetermined angle to the line of said centers, locking means for said hinged member, and a pair of members yieldably secured to said hinged member to engage a pair of diametrically opposite grooves in said spherical member and to clamp the same in said recess, being so positioned as to hold said spherical member with another pair of diametrically opposite grooves in a plane perpendicular to the line of said centers.

ALFRED H. RZEPPA.
FRED F. MILLER, Jr